United States Patent [19]

McClain

[11] 4,148,768

[45] Apr. 10, 1979

[54] POLYMER DISPERSION PROCESS

[75] Inventor: Dorothee M. McClain, Cincinnati, Ohio

[73] Assignee: National Distillers and Chemical Corporation, New York, N.Y.

[21] Appl. No.: 824,875

[22] Filed: Aug. 15, 1977

[51] Int. Cl.$^2$ .............................................. C08K 5/09
[52] U.S. Cl. ........................... 260/23 H; 260/23 AR; 260/29.6 PM
[58] Field of Search ........ 260/23 H, 29.6 PM, 23 AR

[56] References Cited

U.S. PATENT DOCUMENTS

| | | | |
|---|---|---|---|
| 2,653,919 | 9/1953 | Hunter | 260/23 H |
| 3,586,654 | 6/1971 | Lerman et al. | 260/2.5 B |

FOREIGN PATENT DOCUMENTS 88404  3/1972  German Democratic Rep.

Primary Examiner—James H. Derrington
Attorney, Agent, or Firm—Kenneth D. Tremain

[57] ABSTRACT

A process for forming dispersions of olefin polymers and copolymers using an alkali metal soap of fatty acids as the dispersing agent.

Molten thermoplastic resins such as polyethylene are vigorously agitated in admixture with water and in the presence of a lithium salt of a higher fatty acid to produce a dispersion which is then cooled to a temperature below about 100° C. to produce the resin in a pulverulent form.

7 Claims, No Drawings

POLYMER DISPERSION PROCESS

BACKGROUND OF THE INVENTION

Thermoplastic resins in the powder form have found use in a number of applications where it is either impossible or inconvenient to utilize the more conventional cube, pellet or crumb forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additives; mold release agents for rubber; additives to waxes, paints, and polishes; binders for non-woven fabrics; and so on.

Prior art processes for converting polyolefins and olefin copolymers from coarser forms such as cubes, pellets, crumb and the like, which forms usually are obtained directly from the synthesis process, into the powder form include mechanical grinding, spray drying, precipitation from solution, and dispersion in aqueous media. Additionally, powders are also obtained by shock cooling molten polymers with cold gases and by fluxing with minor amounts of long-chain fatty acids and fatty amides.

In the mechanical grinding methods, the polyolefin in granular form is passed through a high shear pulverizing device, e.g., a Pallmann grinder, to yield particles of irregular shape. In addition to requiring specially designed equipment and cooling to remove the heat generated, such processes yield powders which are not entirely suitable for fluidization or dispersion application wherein spherical particles are required.

Solution methods such as spray drying or precipitation require that the polymer either be synthesized in solution or be dissolved in a solvent or solvents. Inherent in such processes are difficulties in manipulating the solvents, completing removal of the solvent from the product, and classifying the resultant powders. The powders from such processes are of irregular, somewhat rounded shape, and consequently possess only moderately satisfactory fluidization characteristics.

The dispersion process of the prior art involves subdivision under high shear agitation of a polymer in a liquid medium with the aid of various dispersing agents. From the standpoint of cost and simplicity of operation, water is generally the preferred dispersion medium. The dispersing agents usually comprise an alkali metal soap such as sodium stearate, potassium stearate, etc. A disadvantage of these dispersing agents is that they tend to become ineffective at the elevated temperatures at which relatively high molecular weight polyolefins are sufficiently fluid to be dispersible in water, and thereby fail to produce dispersions. Consequently, such prior art processes have generally been limited to relatively low molecular weight polyethylenes.

Polyethylene may also be pulverized by shock cooling in the liquid or molten state with cold gaseous ethylene (Frielink, U.S. Pat. No. 3,719,648). However, it does not appear that spherical particles are produced.

In U.S. Pat. Nos. 3,422,049 and 3,746,681, and also in U.S. Pat. No. 3,432,483, an improved aqueous dispersion process is described. In these processes, the resin feed is subjected to vigorous agitation in the presence of water and a block copolymer of ethylene oxide and propylene oxide (the Pluronic dispersants of Badische-Wyandotte Co.) as the dispersing agent at a temperature above the melting point of the resin and at a pressure sufficient to maintain the water in an aqueous state until a dispersion is produced and thereafter cooling the dispersion below the melting point of the resin. This dispersion process produces exceedingly fine, spherical resin particles, with a number average particle size on the order of 10 microns or less.

It has now been found that coarser thermoplastic resin powders of substantially spherical particles can be prepared following the technique of the prior U.S. Patents when a lithium salt of a higher fatty acid is employed as the dispersing agent. It was unpredictable and therefore quite surprising to find that while corresponding sodium and potassium salts were ineffective in dispersing the high molecular weight polymers of this invention in water, the lithium salts were effective. Moreover, since the lithium salts produce larger particles than the Pluronic dispersants, the use of lithium salts presents a method of obtaining larger spherical particles by the process of my prior invention.

The use of higher lithium salts, of course, is not new in polyolefin technology. Drake et al (U.S. Pat. No. 3,484,402) disclose additive compositions for increasing the melt flow and thermal resistance of polypropylene which consist of 4,6-di(4-hydroxy-3,5-di-tert-butylphenoxy)-2-octylthio-1,3,5-triazine and at least one monocarboxylic fatty acid of the metals of Groups I and II, those of Group II being preferred. Arai et al (U.S. Pat. No. 3,803,065) have found that modification of various inorganic powders by mechano-chemical treatment with a soap of a Group I or II metal or of Al or Pb provides an additive that will impart excellent transparency and good anti-blocking characteristics to polyolefins.

Processes for simultaneously dispersing and saponifying ethylene-vinyl acetate (EVA) copolymers to provide particulate hydrolyzed ethylene-vinyl acetate (HEVA) copolymers of high melt index (100–400) are known. In German Democratic Republic (DDR) Patent Specification No. 88,404, there is described a process for simultaneously dispersing and saponifying EVA copolymers employing sodium hydroxide or potassium hydroxide as the saponification agent and an alkyl sulfonate, an acyl derivative of N-methyltaurine, a higher fatty acid soap, an alkaryl sulfonate or a nonionic surface-active agent derived from ethylene oxide as the dispersion agent.

The process described involves saponifying ethylene-vinyl acetate copolymers at elevated temperature and pressure including, as the final step, discharging the reaction mixture at the operating temperature and pressure directly into a quench vessel at atmospheric or subatmospheric pressure. The quench vessel contains water that is stirred during the discharge operation and the rate of discharge of the reaction mixture is regulated by means of a needle valve. Thus, the sudden release of the reaction mixture causing a portion of the reaction medium to vaporize apparently results in formation of the dispersion due to the atomizing effect of the needle valve. This patent also discloses the optional use of dispersants, but it is apparent from the data provided that such dispersants have only a secondary effect, the primary determinant of dispersion being the discharge of the hot reaction mixture to the quenching bath. From the particle size distribution data provided in the disclosure, it is clear that the presence of dispersing agent seems to favor smaller particles, but is not absolutely essential since comparable dispersions are obtained when dispersing agents are not present in the reaction mixture. There is no indication that a dispersion of the polymer occurs in the reaction mixture prior to discharge when dispersing agents are present but the data provided shows that, on discharge, a dispersion is produced in the presence or absence of dispersing agent. Attempts to obtain dispersions of saponified EVA using N-oleolysarconsinate as dispersing agent by merely cooling the reaction mixture without the described discharge step of DDR No. 88,404 have not produced dispersions. Similarly, when arylsulfonate dispersants are employed in lieu of the sarcosinate, no dispersions are obtained when the reaction mixture is cooled. Thus, it must be concluded that dispersion only occurs on discharge.

The dispersed product obtained by the method of DDR No. 88,404 is of fairly large particle size, the heavy majority of the particles being of diameters greater than 0.125 mm, i.e., usually over 80% of the dispersed particles. In addition, the product is composed of irregular particles, with no spherical particles being observed.

SUMMARY OF THE INVENTION

This invention relates to the preparation of pulverulent thermoplastic resins. More particularly, the present invention relates to a process of preparing pulverulent thermoplastic resins by vigorously agitating molten resin in admixture with water in the presence of a lithium salt of a higher fatty acid to produce a fine dispersion and then cooling the resulting dispersion to a temperature below about 100° C.

DESCRIPTION OF THE PREFERRED EMBODIMENTS

The present invention is accomplished by a process in which a normally solid synthetic organic polymeric thermoplastic resin is subjected to vigorous agitation in the presence of water and a lithium salt of a higher fatty acid as the dispersing agent at a temperature above the melting point of the resin until a dispersion is produced and thereafter cooling said dispersion to below about 100° C. before discharging it. The process is carried out in a pressure vessel at autogenous pressure.

In general, the polymers suitable for the practice of this invention include any normally solid synthetic organic polymeric thermoplastic resin whose decomposition point is somewhat higher than its melting point and somewhat less than the critical temperature of water.

The preferred polymers are normally solid, thermoplastic olefin resins. By "olefin resins" as employed herein and in the appended claims is meant polyolefins; olefin copolymers and copolymers of olefins with up to about 15 weight percent of a polar monomer such as vinyl esters, acrylate esters, maleate esters, fumarate esters, itaconate esters, 2-methyleneglutarate esters, sulfur dioxide and carbon monoxide.

The polyolefins most suitable for the practice of this invention include normally solid polymers of olefins, particularly mono-alpha-olefins, which have two to about six carbon atoms, e.g., polyethylene, polypropylene, polybutene, polyisobutylene, poly(4-methylpentene), and the like. Preferred polyolefin feeds are polyethylene and polypropylene. Of particular significance is the fact that the present process is not limited to the relatively low molecular weight polyethylenes of prior art processes, but is equally effective for relatively high molecular weight polyethylene as well as for polypropylene and other higher olefin polymers.

Suitable olefin copolymers include ethylene-propylene, ethylene-butene-1, ethylene-hexene-1; copolymers of olefins with up to about 15 weight percent of polar monomers such as ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, ethylene-dimethyl maleate, ethylene-dibutyl fumarate, ethylene-diethyl 2-methyleneglutarate, ethylene-vinyl acetate-sulfur dioxide, ethylene-vinyl acetate-carbon monoxide, and the like. Especially preferred are ethylene-vinyl acetate copolymers.

In general, thermoplastic resins to which this invention is applicable can have melting points as high as 250° C. For example, relatively low density (0.85–1.00 g/cc) polymers of the type described above which have melting points up to about 200° C. are useful herein. Such low density polymers particularly include homopolymers of ethylene and low density copolymers of ethylene with such monomers as propylene, butene-1, hexene-1, vinyl acetate, vinyl trimethylethyl acetate, methyl acrylate, ethyl acrylate, and vinyl alcohol. Preferred resins are ethylene homopolymers having densities from 0.91–0.96 g/cc and melting points from 90° C. to 136° C. and ethylene copolymers from the above group having densities from 0.85 to 1.00 g/cc and melting points from 55° C. to 180° C.

The dispersing agents of the present invention are lithium salts of higher saturated fatty acids containing at least about 16 carbon atoms, and preferably from about 18 to 26 carbon atoms. The contemplated fatty acids conform to the formula $C_nH_{2n+1}COOH$ in which "n" is at least 15, and preferably from 17 to about 25, and include linear saturated fatty acids such as behenic, stearic, arachidic, lignoceric, and cerotic acids and mixtures thereof. Of these acids, behenic is preferred.

As illustrated in the accompanying examples, when the corresponding sodium, calcium and nickel salts are employed, the desired pulverulent product is not obtained. When lithium salts of the corresponding ethylenically unsaturated acids, such as oleic acid, are used, the average particle size of the resulting product is generally above 1000 microns.

The lithium salts are both stable and effective at temperatures ranging up to about 325° C. or higher and more particularly at temperatures above about 160° C., especially at temperatures in the range of about 175° C. to 270° C. The ability of these salts to retain effectiveness as dispersing agents at high temperatures is extremely significant and useful. The soaps used by the prior art were found to exert their dispersing ability at temperatures ranging up to about 160° C. but became inactive at higher temperatures. Since in many instances, dispersion temperatures higher than 160° C. are either necessary or highly desirable, such prior art soaps are severely limited in their ability to produce dispersions.

The temperature of operation is dependent upon the melting point, melt flow properties, decomposition temperature, and desired fineness of dispersion of the selected synthetic organic thermoplastic resin. While such resins can be dispersed at temperatures commencing with their respective melting points, increases in dispersion temperature beyond the melting point and up to the decomposition point of the resins are generally accompanied by corresponding increase in the fluidity of the molten resin. As the fluidity of the melt increases, the dispersions generally tend to develop lower average particle sizes without requiring increases in agitation effort.

The flow properties of a molten polymeric resin are closely related to its molecular weight. As the molecular weight of a given type of polymer is increased, its fluidity at a given temperature tends to lessen, that is, the polymer tends to offer greater resistance to breakdown to small particles. On the other hand, the melting point of the polymer varies little with changes in molecular weight. Consequently, while two polymers of the same type, e.g., low density polyethylene, but of different molecular weights may exhibit the same melting point and therefore be dispersable commencing at the same temperature, the higher molecular weight polymer will require high dispersion temperatures for the same agitation effort to achieve a fineness of dispersion equivalent to that of the polymer of lower molecular weight.

A convenient measure of the fluidity or flow of a thermoplastic polymer is afforded by the melt flow rate value as outlined under ASTM test method D1238-57T. For example, melt flow rates may be determined at standard test temperatures of 125°, 150° and 190° C. employing a 2160 g weight. By plotting these melt flow rates against temperature, a graph is obtained from which melt flow rates at other temperatures may be read by interpolation and extrapolation. Melt flow rates cited hereinafter at temperatures other than the standard test temperatures were determined graphically in this manner.

The novel dispersing agents of the present invention, by functioning effectively from temperatures as low as the melting point of low density polyethylene, i.e., about 108° C., up to as high as 325° C., are not limited to the dispersion of low molecular weight low density polyethylenes. For example, high molecular weight low density polyethylenes, linear polyethylene, polypropylene, ethylene-vinyl acetate copolymers, ethylene-vinyl alcohol copolymers, nylon, and the like which exhibit melt flow rates below about 15 at 160° C. can be readily dispersed by means of the subject novel dispersing agents to dispersions substantially devoid of particles larger than 500 microns and the particles have a relatively narrow size range. The number-average particle size of the powders produced by the lithium salts will be larger than that of the fine powders that are formed by the Pluronic dispersants as disclosed in U.S. Pat. Nos. 3,422,049 and 3,432,483, where the number-average particle size is of the order of 10 microns. Typically, the number-average particle size of the powders produced by the lithium salts of the present invention will range from 20 microns to as high as 100 microns. Where it is desired to prepare the finest dispersion of a given polymer, the dispersion temperature should be such that the resin being dispersed exhibits a melt flow rate of greater than 15, and, more preferably, greater than 20. Where larger average particle sizes are desired or acceptable, however, dispersion temperatures may be employed, still in combination with only relatively mild agitation, at which the polymer exhibits a melt flow rate appreciably lower than 15, for example, as low as about 2.

The dispersing apparatus or device may be any device capable of delivering at least a moderate amount of shearing action under elevated temperatures and pressures to a liquid mixture. Suitable, for example, are conventional autoclaves equipped with conventional propeller stirrers. Propellers designed to impart greater shear to the mixture tend to improve the recovered yield of pulverulent polymer, but with little effect on the particle size and distribution of recovered polymer. The particle size and distribution are somewhat dependent on the stirring rate, higher stirring speeds resulting in finer and narrower dispersions until an optimum speed is reached above which there is little change. The overall recovery yield of pulverulent polyolefin from the dispersion is dependent upon the duration of stirring. For a given type and rate of stirring, a period of stirring exists within which maximum recoverable yields of pulverulent polyolefins result. Either shorter or longer periods of stirring result in lower recoverable yields. Preferred stirring periods generally will range from about 1 to 20 minutes, and preferably from about 5 to 15 minutes. It will be understood, however, that the stirring rates and periods will depend upon the type of equipment utilized.

While the rate and duration of agitation affect particle size and distribution and recoverable yields of pulverulent polymer, these variables can be readily optimized for any given polyolefin through simple, routine experimentation.

In carrying out the subject process, the selected synthetic organic thermoplastic polymer is first contacted with water and the dispersing agent. It is a particularly advantageous feature of this invention that the dispersing agent need not be incorporated into the polymer prior to the introduction of the water by such means as milling and the like, but may be introduced into the dispersing apparatus simultaneously with the other ingredients or as a dispersion in the aqueous phase. If desired, the dispersion process may be operated in a continuous manner, in which case it is convenient to premix the desired ratio of dispersing agent, water, and polymer, and introduce this mixture continuously to the reactor while continuously removing the product dispersion from another part of the reactor.

The amount of water used in relation to the polymer dispersed preferably ranges from about 0.33 to 25 parts by weight of water per part of normally solid polymer, most preferably between about 4 and 20 parts per part of polymer. To prepare dispersions which are more dilute, it is usually more economical to dilute a more concentrated dispersion. Dispersions containing more than about 60 percent of polymer are generally quite viscous and difficult to handle. To a limited extent, the dispersion becomes finer as the concentration of polymer increases, other conditions being held constant.

The amount of dispersing agent to be used will vary with the amount of resin employed, the desired particle size and other factors, such as the amount of water employed. In general, the amount of dispersing agent should be sufficient to disperse the molten resin under the selected conditions for forming the dispersion. Usually it is preferred to use at least 5 parts of dispersing agent per 100 parts of resin, with the preferred range being from about 5 to 15 parts per 100 parts of resin. Larger amounts of the dispersing agent show no significant influence on the resultant product and tend to make subsequent removal of the dispersing agent from the polymer more difficult. It is preferred that the amount of dispersing agent also be adjusted with respect to the amount of water present so that the amount of dispersing agent present is at least about 0.5% by weight based on the water present, and preferably above about 1%. If the amount of dispersing agent present based on the water present is below 0.5% by weight, the particles tend to be of larger diameter and the number average particle size is larger than 100 microns.

In the specific embodiment of this invention wherein it is desired to prepare polymers of relatively fine particle size, for example, olefin homopolymers and olefin copolymers whose number average particle size is about 10 to 100 microns, upon feeding the ingredients to the dispersing device, the temperature is brought to a level at which the melt flow rate of the polymer being dispersed is at least 15, and more preferably at least 20. Generally, the temperature at which the polymers of the invention exhibit melt flow rates of at least 15 ranges from about 110° C. for low molecular weight polymers, e.g., low molecular weight low density polyethylene, up to the critical temperature of water for the relatively high molecular weight and highly crystalline polymers. For the preferred polymers, dispersion temperatures range from about 160° to 325° C. For example, a polymer such as a linear polyethylene with a flow rate of 10 at 190° C. requires a dispersion temperature of about 245° C. whereas a polymer such as a polypropylene with a melt flow rate of 7 at 230° C. requires a dispersion temperature above about 265° C. As aforementioned, the use of lower temperatures, that is, down to the melting point of the polymer, will also yield dispersions, but of a coarser particle size.

The pressure under which the present process is carried out is autogenous, i.e., the vapor pressure exerted by the contents of the dispersion autoclave, care being taken to maintain water at the operating temperature as a liquid phase. More particularly, the pressures may range from about 1 to 200 atmospheres, and preferably from about 6 to 120 atmospheres. In cases where the polymer is sensitive to air at the elevated dispersion temperatures, an inert gas, e.g., nitrogen or helium, may be substituted for the air normally present, and deaerated water used. If desired, additional pressure may be imposed, as by pressuring with an inert gas.

The dispersions resulting from the above process are compositions comprising a dispersion of a normally solid synthetic organic polymeric thermoplastic resin in water in the presence of a minor amount of the lithium soap. If the dispersion is capable of forming a continuous film upon removal of the aqueous phase by evaporation, it is more definitely termed a latex. The above dispersions or latices may be utilized in coating metal or paper, in polish formulations, in paint formulations, for textile sizing and water-proofing for coating fibers, etc.

For recovery, the dispersion is cooled to below about 100° C. before removal from the autoclave. In the case of dispersions which are not latices, the polymer is separated from the aqueous phase in the form of discrete particles by filtration, evaporation of the water, and the like. If the temperature of the subject dispersion is lowered to below about 100° C. and the pressure (if any) released, the finely divided polymer may be recovered by simple atmospheric filtration. Dispersions whose number average particle size is below about 10 microns are relatively stable as such and thus should be broken by dilution with added water prior to filtration.

Drying of the recovered finely-divided polymer yields a free-flowing powder of spherical shape, fine particle size and narrow particle size distribution. Generally, all of the dispersed particles have diameters less than 500 microns. By varying the composition of the subject dispersing agents and the ratio of polymer to water, number-average particle size can be varied to a desired level, in particular with a relatively narrow size distribution. Especially preferred are particles of narrow size distribution wherein the number-average particle size is less than about 100 microns and more desirably less than 50 microns. The spherical shape contributes superior fluidization characteristics; consequently, the finely-divided polymers of this invention are superior in powder form for static or fluidized dip coating, spraying, dusting, and flame spraying applications. The relatively high molecular weight polymers of this invention also find use in the preparation of heat resistant coatings, in the preparation of molded or formed shapes by powder or rotational molding techniques, and in the preparation of foams in combination with conventional blowing agents.

The following examples further illustrate this invention. Throughout this specification and claims, all parts and percentages are by weight and temperatures in degrees Centigrade unless otherwise indicated.

The apparatus used comprised a cylindrical two-liter, 4-inch diameter pressure reactor (Parr Instrument Company) equipped with a thermowell, a rupture disc assembly, a stirrer bearing and shaft, and a pressure gauge. Power was supplied to the stirrer by means of a Bodine type fractional horsepower motor having an output of 18,000 r.p.m. (idling). The stirring propeller was either a conventional blade type (3 blades, 2-inch diameter) or a type comprising two curved tooth turbine-type discs (3-inch diameter). The stirring speed employed was 8,000 to 10,000 r.p.m.

EXAMPLE 1

In a series of dispersion experiments, polyethylene having a density of 0.915 g/cc and a melt index of 19 g/10 minutes at 190° C. in the form of pellets, lithium behenate and distilled and deaerated water are charged to the reactor in the amounts shown in Table I. The air is replaced by nitrogen and heat applied until the temperature of the mixture reaches 250° C. at a pressure of 577 p.s.i. Stirring is started and continued for a period of 7 to 10 minutes. Stirring is then discontinued and the temperature of the dispersion is, for convenience, rapidly dropped by cooling the reactor with dry ice, thereby lowering the temperature to below 100° C. The residual pressure is bled off, and the obtained dispersion diluted with water, filtered and the residue dried. The sieve analysis of each product appears in Table I.

EXAMPLE 2

Substantially as described in Example 1, 30 g. of the same polyethylene is dispersed in 600 ml. of distilled and deaerated water in the presence of 12 g. of lithium stearate. 84.5 percent of the polyethylene is recovered in finely-divided form. 4.9 percent are smaller than 53 microns, 6.5 percent have a particle size of 53 to 105 microns, 19.6 percent a particle size of 105 to 210 microns and 45.4 percent a particle size of 210 to 500 microns.

EXAMPLE 3

Example 2 is repeated except that 60 grams of polyethylene is used. 65.0 percent of the polyethylene is recovered in finely-divided form of which 2.7 percent have a particle size of less than 53 microns, 4.8 percent a particle size of 53 to 105 microns, 12.8 percent a particle size of 105 to 210 microns, and 44.5 percent a particle size of 210 to 500 microns.

EXAMPLE 4

Following the procedure of Example 1, attempts to obtain dispersions of polyethylene are made employing sodium behenate and nickel behenate. In neither instance is a dispersion obtained. With calcium behenate, very little dispersion results. Similarly, with lithium caprylate, no dispersion is obtained. With lithium erucate, a dispersion is obtained but 50 percent of the resulting particles have a particle size in excess of 1,000 microns.

With lithium oleate, 25 percent of the polyethylene charged is dispersed, but the particle size of the dispersed material is 1,000 microns or greater. With lithium dimer oleate and lithium trimer oleate, 66 percent of the polyethylene charged is dispersed but the particle size is 1,000 microns or greater. With the lithium half salt of dimer oleate acid, 80 percent of the polyethylene charged is dispersed but the particle size is 1,000 microns or greater.

taining up to about 15 weight percent of polar monomer by vigorously agitating said resin in molten form in water in the presence of a dispersing agent at a temperature below the degradation temperature of said resin to produce a dispersion of said resin and cooling said dispersion to below about 100° C. the improvement wherein the dispersing agent is a lithium salt of a higher saturated fatty acid containing from 18 to 26 carbon atoms.

2. Process according to claim 1 wherein the polyolefin is polyethylene.

3. A process for preparing in pulverulent form a normally solid thermoplastic resin selected from the group consisting of polyolefin or olefin copolymer containing up to about 15 weight percent of polar monomer which comprises vigorously agitating said resin in molten form in water in the presence of a dispersing agent comprising lithium behenate at a temperature below the degradation temperature of said resin to produce a dispersion of said resin and cooling said dispersion to below about 100° C.

4. Process according to claim 3 wherein the resin is polyethylene.

5. Process according to claim 3 wherein the resin is an ethylene-vinyl acetate copolymer containing up to about 15 weight percent of vinyl acetate.

6. Process according to claim 3 wherein the dispersing agent is employed at a level of at least about 5 parts per 100 parts of resin.

TABLE I

PARTICLE YIELD AND SIZE DISTRIBUTION IN THE DISPERSION OF POLYETHYLENE (PE) WITH LITHIUM BEHENATE
Polyethylene: Melt Index = 19 g/10 Min.

| | | Charge to Pressure Reactor | | | | | Yield of Particles | Sieve Analysis of Particles With a Diameter Below 500 Microns, in Wt. %/2/ | | | | |
|---|---|---|---|---|---|---|---|---|---|---|---|---|
| | | PE | | Lithium Behenate | | | With a Diameter Below | Below | | | | Number Average Particle |
| Exp. No. | Water, ml. | g. | %/1/ | g. | % in $H_2O$ | % on PE | 500 Microns, Wt. % | 53 Microns | 53–105 Microns | 105–210 Microns | 210–500 Microns | Size, Microns |
| 1 | 450 | 220 | 32.4 | 9 | 1.96 | 3.93 | 52.9 | 1.6 | 14.8 | 21.9 | 61.8 | 85.6 |
| 2 | 480 | 120 | 19.7 | 9.6 | 1.96 | 7.41 | 91.0 | 0.7 | 8.3 | 54.4 | 36.5 | 71.1 |
| 3 | 480 | 120 | 19.5 | 16.0 | 3.22 | 11.8 | 48.0 | 4.0 | 7.3 | 18.5 | 70.2 | 54.4 |
| 4 | 480 | 144 | 22.7 | 9.6 | 1.96 | 6.25 | 44.0 | 1.7 | 9.2 | 16.3 | 72.8 | 81.6 |
| 5 | 600 | 30 | 4.76 | 0.6 | 0.10 | 2.00 | 0.0 | — | — | — | — | — |
| 6 | 600 | 30 | 4.74 | 2.4 | 0.40 | 7.41 | 59.0 | — | — | 29.4 | 70.6 | 291.0 |
| 7 | 600 | 30 | 4.67 | 12.0 | 1.96 | 28.6 | 75.8 | 5.5 | 15.7 | 29.3 | 49.2 | 36.3 |
| 8 | 600 | 60 | 8.93 | 12.0 | 1.96 | 16.7 | 85.0 | 7.5 | 17.4 | 29.2 | 45.9 | 34.4 |
| 9 | 600 | 90 | 12.8 | 12.0 | 1.96 | 11.8 | 97.9 | 3.7 | 21.0 | 30.8 | 44.5 | 41.9 |
| 10 | 600 | 120 | 16.7 | 12.0 | 1.96 | 9.1 | 95.0 | 0.8 | 11.4 | 38.4 | 49.1 | 65.1 |
| 11 | 910 | 198 | 16.7 | 79.2 | 8.01 | 28.6 | 93.3 | 1.11 | 8,82 | 17.4 | 72.1 | 99.3 |

/1/ Based on total weight of water, PE and lithium behenate.
/2/ Fraction greater than 500 microns was dispersed but was regarded as unsuitable for most powder applications.

What is claimed is:

1. In the process of preparing in pulverulent form a normally solid thermoplastic resin selected from the group consisting of polyolefin or olefin copolymer con- 7. Process according to claim 3 wherein the dispersing agent is employed at a level of from about 5 to about 15 parts per 100 parts of resin.

* * * * *